(12) United States Patent
Sugita et al.

(10) Patent No.: US 8,197,984 B2
(45) Date of Patent: Jun. 12, 2012

(54) FUEL CELL STACK

(75) Inventors: Narutoshi Sugita, Utsunomiya (JP);
Takashi Kosaka, Utsunomiya (JP);
Ayumu Ishizuka, Utsunomiya (JP); Ken Takahashi, Shimotsuga-gun (JP);
Hiroshi Morikawa, Shioya-gun (JP);
Teruyuki Ohtani, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 953 days.

(21) Appl. No.: 10/898,571

(22) Filed: Jul. 23, 2004

(65) Prior Publication Data
US 2005/0019643 A1    Jan. 27, 2005

(30) Foreign Application Priority Data

Jul. 24, 2003 (JP) ................................. 2003-279160

(51) Int. Cl.
*H01M 2/14* (2006.01)
(52) U.S. Cl. ........ 429/508; 429/507; 429/512; 429/513; 429/514; 429/517; 429/518
(58) Field of Classification Search .................... None
See application file for complete search history.

(56) References Cited

U.S. PATENT DOCUMENTS

| | | | | |
|---|---|---|---|---|
| 5,776,624 | A * | 7/1998 | Neutzler | 429/26 |
| 5,789,093 | A * | 8/1998 | Malhi | 429/34 |
| 5,993,987 | A * | 11/1999 | Wozniczka et al. | 429/470 |
| 6,051,331 | A * | 4/2000 | Spear et al. | 429/34 |
| 6,531,236 | B1 * | 3/2003 | Hatoh et al. | 429/34 |
| 6,849,355 | B2 | 2/2005 | Wakahoi et al. | |
| 2002/0034672 | A1 * | 3/2002 | Saito et al. | 429/34 |
| 2002/0102453 | A1 * | 8/2002 | Suenaga et al. | 429/37 |
| 2002/0142209 | A1 * | 10/2002 | Kikuchi et al. | 429/34 |

FOREIGN PATENT DOCUMENTS

| | | |
|---|---|---|
| JP | 2000-048850 | 2/2000 |
| JP | 2000-067903 | 3/2000 |
| JP | 2001-135344 | 5/2001 |
| JP | 2002-151136 | 5/2002 |
| JP | 2002-298901 | 10/2002 |
| JP | 2003-151571 | 5/2003 |

OTHER PUBLICATIONS

Japanese Office Action Patent Application No. 2003-279160, dated Jan. 17, 2006.
German Office Action for Application No. 102004035242.9, dated Sep. 19, 2006.

* cited by examiner

*Primary Examiner* — Cynthia Lee
(74) *Attorney, Agent, or Firm* — Nelson Mullins Riley & Scarborough LLP; Anthony A. Laurentano

(57) ABSTRACT

A fuel cell stack includes a box-shaped casing and a stack body in the box-shaped casing. The stack body is formed by stacking a plurality of unit cells. The casing includes end plates, a plurality of side plates, angle members, and coupling pins. The angle members couple adjacent ends of the side plates. The coupling pins couple the end plates and the side plates.

8 Claims, 5 Drawing Sheets

FUEL CELL STACK

BACKGROUND OF THE INVENTION

1. Field of the Invention

The present invention relates to a fuel cell stack including a box-shaped casing and a stack body in the casing. The stack body is formed by stacking a plurality of unit cells. Each of the unit cells includes an electrolyte electrode assembly and metal separators sandwiching the electrolyte electrode assembly. The electrolyte electrode assembly includes a pair of electrodes, and an electrolyte interposed between the electrodes.

2. Description of the Related Art

For example, a solid polymer fuel cell employs a membrane electrode assembly (electrolyte electrode assembly) which includes an anode and a cathode, and an electrolyte membrane (electrolyte) interposed between the anode and the cathode. The electrolyte membrane is a polymer ion exchange membrane. Each of the anode and the cathode is made of electrode catalyst layer of noble metal formed on a base material chiefly containing carbon. The membrane electrode assembly and separators sandwiching the membrane electrode assembly make up a unit of a fuel cell for generating electricity.

In the fuel cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electric current. A gas chiefly containing oxygen or air (oxygen-containing gas) is supplied to the cathode. At the cathode, the hydrogen ions from the anode combine with the electrons and oxygen to produce water.

Generally, a predetermined number of, e.g., several tens to several hundreds of fuel cells are stacked together to form a fuel cell stack for achieving the desired level of electricity in power generation. Components of the fuel cell stack need to be tightened together so that the internal resistance of the fuel cell does not increase, and the sealing characteristics for preventing leakage of reactant gases can be maintained.

In this regard, a fuel cell stack as disclosed in Japanese laid-open patent publication No. 2001-135344 is known. As shown in FIG. 5, the fuel cell stack includes a stack body 2 formed by stacking a plurality of unit cells 1. End plates 3 are provided at opposite ends of the stack body 2 in the stacking direction. Further, auxiliary plates 4a, 4b are provided outside the end plates 3.

A pair of tightening bands 5 are provided along both sides of the stack body 2. Cylindrical coupling members 6 are provided such that holes of the coupling members 6 are arranged in a line respectively at ends of the tightening bands 5, and the auxiliary plates 4a, 4b. Metal pins 7 are inserted into the holes of the cylindrical members 6. Thus, the tightening bands 5, and the auxiliary plates 4a, 4b are coupled together.

According to the disclosure of Japanese laid-open patent publication No. 2001-135344, a plurality of bolts 8 are screwed into holes of the auxiliary plate 4a, and a plurality of belleville springs 9 are arranged on the auxiliary plate 4b. When the bolts 8 are screwed into the auxiliary plate 4a, the end plate 3 is pressed downwardly, and the belleville springs 9 on the auxiliary plate 4b are compressed. Accordingly, the required tightening force is applied to the stack body 2 between the pair of end plates 3.

However, in the conventional technique disclosed in Japanese laid-open patent publication No. 2001-135344, since the tightening force is applied to the stack body 2 using the bolts 8 and the belleville springs 9, the pressure may not be applied uniformly to the unit cells 1 due to the thickness variation in the surfaces of the unit cells 1. In particular, when a thin corrugated metal plate is used as the separator, the metal separator is likely to be deformed undesirably due to the tightening force applied to the metal separator. In this case, the pressure is not applied to the surfaces of the unit cells 1 uniformly. Consequently, power generation performance and sealing characteristics are lowered.

Further, the pair of tightening bands 5 are provided along both sides of the stack body 2, and the stack body 2 is tightened only by the tightening bands 5 and the auxiliary plates 4a, 4b. Thus, the stack body 2 is deformed or twisted easily. Therefore, the dimensional variation of the fuel cell stack is likely to be increased easily. In practical use, the fuel cell stack is not suitably mounted in a vehicle.

Further, when an external force is applied to the fuel cell stack, lateral positional displacement may occur in the unit cells 1. Thus, the power generation performance and sealing characteristics may be lowered undesirably. In particular, the tightening bands 5 are not suitable for securely tightening the stack body 2. When vibrations or shocks are applied to the stack body 2, positional displacement may occur undesirably in the stack body 2.

SUMMARY OF THE INVENTION

A main object of the present invention is to provide a fuel cell stack using metal separators to achieve a compact size and a lightweight in which the desired power generation performance and sealing characteristics are maintained in each of unit cells.

According to the present invention, a fuel cell stack includes a box-shaped casing and a stack body provided in the box-shaped casing. The stack body is formed by stacking a plurality of unit cells in a stacking direction. Each of the unit cells includes an electrolyte electrode assembly and metal separators sandwiching the electrolyte electrode assembly. The casing includes end plates provided at opposite ends of the stack body in the stacking direction, a plurality of side plates provided on sides of the stack body, coupling members for coupling adjacent ends of the side plates, and a coupling pin for coupling the end plate and the side plate.

For example, the side plates of the casing are coupled together securely by the coupling member, e.g., an angle member such as an L angle. The side plate and the end plate are coupled by the coupling pin. Thus, the stack body is housed in the casing, and the casing is assembled into the box shape. Since the metal separator has the elasticity, no belleville spring needs to be provided in the casing.

Preferably, terminal plates are provided at opposite ends of the stack body in the stacking direction, and an insulating spacer member is interposed at least one of the terminal plates and the end plate.

Preferably, the end plate has a rectangular shape, and each side of the rectangular end plate is coupled to the side plate by the coupling pin.

Further, preferably, the unit cells are stacked in a horizontal direction.

According to the present invention, the stack body is housed in the box-shaped casing. Therefore, although the separators are thin corrugated plates, and do not have any shape retaining characteristics, the pressure is uniformly applied to surfaces of the unit cells. Thus, power generation performance and sealing characteristics are improved in each of the unit cells. Since the coupling pins are used for coupling the end plates and the side plates, operations such as tightening adjustment of bolts are not required at the time of assembling the fuel cell stack. Thus, the fuel cell stack can be assembled simply. Further, since the coupling pins are used in the casing, the sides of the stack body are kept in parallel, and are not likely to be displaced undesirably. The positional displacement due to vibrations or shocks can be prevented.

Further, since the elasticity of the metal separators is advantageously utilized, it is not required to provide any belleville spring in the casing. Thus, a compact and light fuel cell stack as a whole can be produced easily. Since no belleville spring is used, the stack body including the metal separators is not deformed undesirably.

The stack body is not deformed or twisted undesirably. Therefore, dimensional variation in the fuel cell stack is reduced. In practical use, the fuel cell stack is suitably mounted in a vehicle. Further, since the side plates are securely coupled together by the angle members, even if an external force is applied to the fuel cell stack, lateral positional displacement is not likely to occur in each of the unit cells. Even if shocks are applied to the unit cells, the power generation performance and the sealing characteristics can be maintained.

The insulating spacer member is interposed between the terminal plate and the end plate. Therefore, even if there is dimensional variation of the stack body due to the difference of dimensions depending on the unit cells, the dimensional variation is absorbed simply by changing the thickness of the spacer member. The fuel cell stack has a small size and lightweight as a whole. The fuel cell stack can be assembled easily and simply.

The sides of the rectangular end plates are coupled to the side plates by the coupling pins, respectively. Thus, the stack body is not tilted undesirably unlike the case where only two sides of the plates are coupled. The unit cells are stacked in the horizontal direction. Therefore, the sides of the stack body can be arranged easily in parallel unlike the case where the unit cells are stacked in the vertical direction. Accordingly, the undesirable deformation of the stack body can be reduced.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
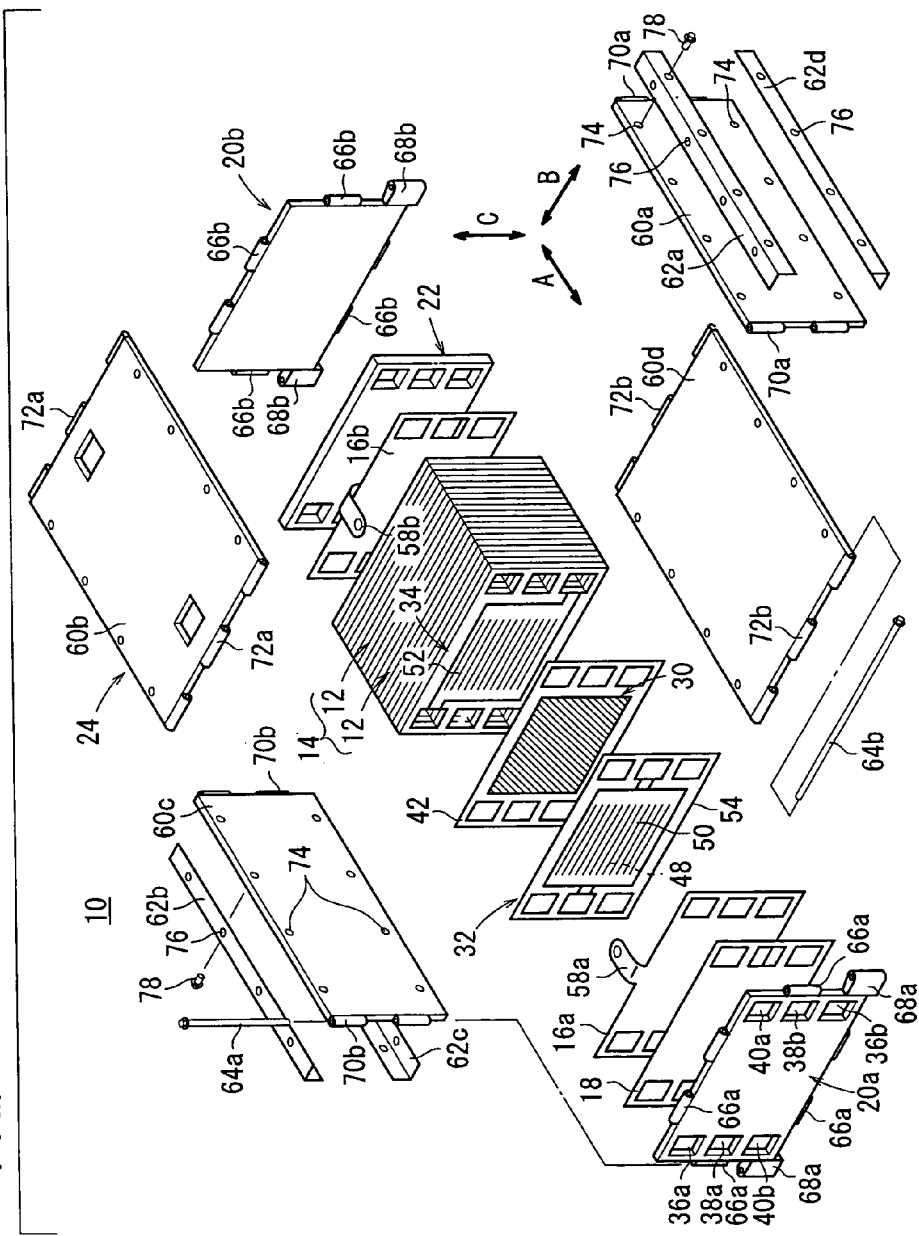
FIG. 1 is an exploded perspective view schematically showing part of a fuel cell stack according to an embodiment of the present invention.
Figure 2:
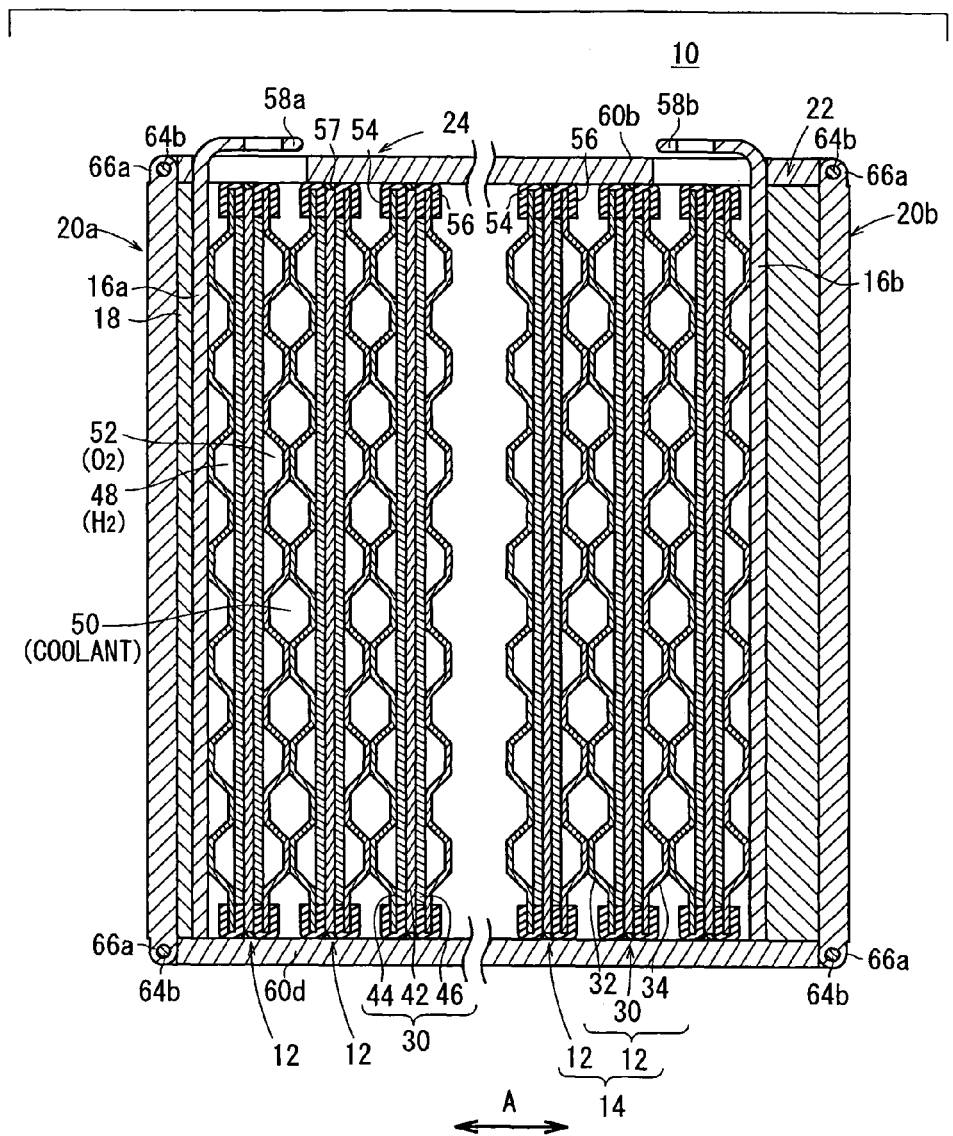
FIG. 2 is a cross sectional side view showing part of the fuel cell stack.

FIG. 1 is an exploded perspective view schematically showing part of a fuel cell stack 10 according to an embodiment of the present invention. FIG. 2 is a cross sectional side view showing part of the fuel cell stack 10.

As shown in FIG. 1, the fuel cell stack 10 includes a stack body 14 formed by stacking a plurality of unit cells 12 horizontally in a stacking direction indicated by an arrow A. At an end of the stack body 14 in the stacking direction indicated by the arrow A, a terminal plates 16a is provided. An insulating plate 18 is provided outside the terminal plate 16a. Further, an end plate 20a is provided outside the insulating plate 18. At the other end of the stack body 14 in the stacking direction, a terminal plate 16b is provided. An insulating spacer member 22 is provided outside the terminal plate 16b. Further, an end plate 20b is provided outside the insulating spacer member 22. Each of the end plates 20a, 20b has a rectangular shape. The fuel cell stack 10 is assembled together such that the stack body 14 formed by stacking the unit cells 12 is housed in a casing 24 including the end plates 20a, 20b.

Figure 3:
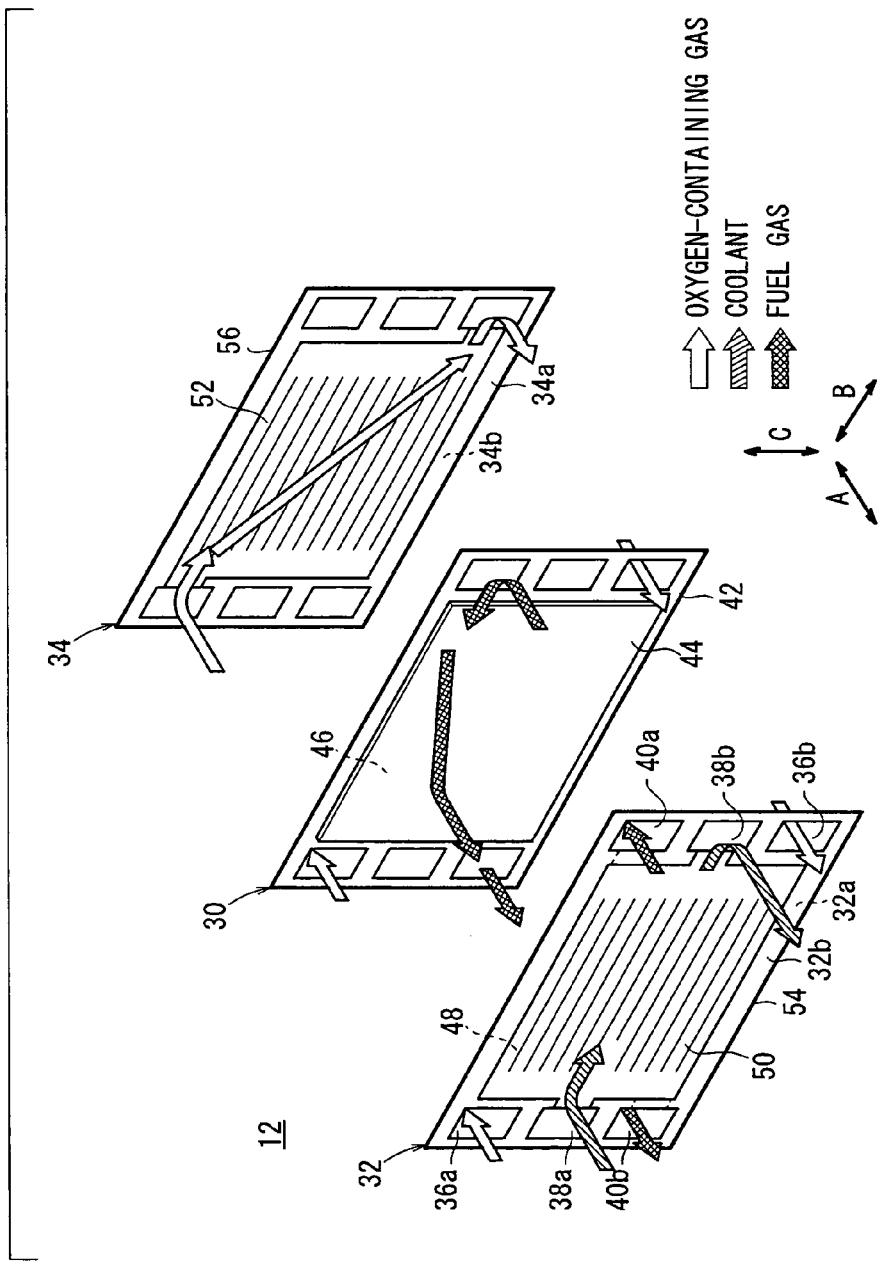
FIG. 3 is an exploded perspective view showing a unit cell of the fuel cell stack.

As shown in FIGS. 2, 3, each of the unit cells 12 includes a membrane electrode assembly (electrolyte electrode assembly) 30 and first and second metal separators 32, 34 sandwiching the membrane electrode assembly 30. The first and second metal separators 32, 34 are thin corrugated plates.

At one end of the unit cell 12 in a longitudinal direction indicated by an arrow B in FIG. 3, an oxygen-containing gas supply passage 36a for supplying an oxygen-containing gas, a coolant supply passage 38a for supplying a coolant, and a fuel gas discharge passage 40b for discharging a fuel gas such as a hydrogen-containing gas are arranged vertically in a direction indicated by an arrow C. The oxygen-containing gas supply passage 36a, the coolant supply passage 38a, and the fuel gas discharge passage 40b extend through the unit cell 12 in the direction indicated by the arrow A.

At the other end of the unit cell 12, a fuel gas supply passage 40a for supplying the fuel gas, a coolant discharge passage 38b for discharging the coolant, and an oxygen-containing gas discharge passage 36b for discharging the oxygen-containing gas are arranged vertically in the direction indicated by the arrow C. The fuel gas supply passage 40a, the coolant discharge passage 38b, and the oxygen-containing gas discharge passage 36b extend through the unit cell 12 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

The first metal separator 32 has a fuel gas flow field 48 on its surface 32a facing the membrane electrode assembly 30. The fuel gas flow field 48 is connected to the fuel gas supply passage 40a at end, and connected to the fuel gas discharge passage 40b at the other end. The fuel gas flow field 48 includes a plurality of grooves extending in the direction indicated by the arrow B, for example. Further, the first metal separator 32 has a coolant flow field 50 on the other surface 32b. The coolant flow field 50 is connected to the coolant supply passage 38a at one end, and connected to the coolant discharge passage 38b at the other end. The coolant flow field 50 includes a plurality of grooves extending in the direction indicated by the arrow B.

The second metal separator 34 has an oxygen-containing gas flow field 52 on its surface 34a facing the membrane electrode assembly 30. The oxygen-containing gas flow field 52 is connected to the oxygen-containing gas supply passage 36a at one end, and connected to the oxygen-containing gas discharge passage 36b at the other end. The oxygen-containing gas flow field 52 includes a plurality of grooves extending in the direction indicated by the arrow B. The other surface 34b of the second metal separator 34 is stacked on the surface 32b of the first metal separator 32. When the first metal separator 32 and the second metal separator 34 are stacked together, the coolant flow field 50 is formed between the surface 32b of the first metal separator 32 and the surface 34b of the second metal separator 34.

A first seal member 54 is formed integrally on the surfaces 32a, 32b of the first metal separator 32 to cover (sandwich) the outer edge of the first metal separator 32. The first seal member 54 is provided around the fuel gas supply passage 40a, the fuel gas discharge passage 40b, and the fuel gas flow field 48 on the surface 32a of the first metal separator 32. The first seal member 54 is not provided between the fuel gas supply passage 40a and the fuel gas flow field 48, and between the fuel gas discharge passage 40b and the fuel gas flow field 48. Thus, the fuel gas supply passage 40a and the fuel gas discharge passage 40b are connected to the fuel gas flow field 48.

A second seal member 56 is formed integrally on the surfaces 34a, 34b of the second metal separator 34 to cover (sandwich) the outer edge of the second metal separator 34. The second seal member 56 is provided around the oxygen-containing gas supply passage 36a, the oxygen-containing gas discharge passage 36b, and the oxygen-containing gas flow field 52 on the surface 34a of the second metal separator 34. The second seal member 56 is not provided between the oxygen-containing gas supply passage 36a and the oxygen-containing gas flow field 52, and between the oxygen-containing gas discharge passage 36b and the oxygen-containing gas flow field 52. Thus, the oxygen-containing gas supply passage 36a and the oxygen-containing gas discharge passage 36b are connected to the oxygen-containing gas flow field 52.

The first seal member 54 is provided around the coolant supply passage 38a, the coolant discharge passage 38b, and the coolant flow field 50 on the surface 32b of the first metal separator 32. The second seal member 56 is provided around the coolant supply passage 38a, the coolant discharge passage 38b, and the coolant flow field 50 on the surface 34b of the second metal separator 32. The first seal member 54 and the second seal member 56 are not provided between the coolant supply passage 38a and the coolant flow field 50, and between the coolant discharge passage 38b and the coolant flow field 50. Thus, the coolant supply passage 38a and the coolant discharge passage 38b are connected to the coolant gas flow field 50.

As shown in FIG. 2, a seal 57 is interposed between the first and second seal members 54, 56 so that the outer edge of the solid polymer electrolyte membrane 42 does not directly contact the casing 24. A small clearance may be formed between the outer edges of the first and second seal members 54, 56, and an inner surface of the casing 24. Alternatively, the outer edges of the first and second seal members 54, 56 may be in contact with the inner surface of the casing 24. In the structure, the first and second metal separators 32, 34 are not deformed excessively beyond a predetermined extent.

As shown in FIGS. 1 and 2, plate-shaped terminals 58a, 58b extend from the terminal plates 16a, 16b, respectively. The terminals 58a, 58b are connected to a load such as a motor of a vehicle.

As shown in FIG. 1, the casing 24 includes the end plates 20a, 20b, a plurality of side plates 60a to 60d, angle members (e.g., L angles) 62a to 62d, and coupling pins 64a, 64b. The side plates 60a to 60d are provided on sides of the stack body 14. The angle members 62a to 62d are used as coupling members for coupling adjacent ends of the side plates 60a to 60d. The coupling pins 64a, 64b are used for coupling the end plates 20a, 20b and the side plates 60a to 60d. The length of the coupling pins 64a is short in comparison with the length of the coupling pins 64b. The angle members 62a to 62d may be integral with at least one of the side plates 60a to 60d.

Each of upper and lower ends of the end plate 20a has two tabs 66a. Each of upper and lower ends of the end plate 20b has two tabs 66b. Each of left and right ends of the end plate 20a has one tab 66a. Each of left and right ends of the end plate 20b has one tab 66b. The end plate 20a has mounting bosses 68a on its left and right ends at lower positions. The end plate 20b has mounting bosses 68b on its left and right ends at lower positions. The bosses 68a, 68b are fixed to mounting positions (not shown) using bolts or the like for installing the fuel cell stack 10 in a vehicle, for example.

The side plates 60a, 60c are provided on opposite sides of the stack body 14. Each of longitudinal ends of the side plate 60a has two tabs 70a. Each of longitudinal ends of the side plate 60b has two tabs 70b. The side plate 60b is provided on the upper side of the stack body 14, and the side plate 60d is provided on the lower side of the stack body 14. Each of longitudinal ends of the side plate 60b has three tabs 72a. Each of longitudinal ends of the side plate 60d has three tabs 72b.

In assembling the end plates 20a, 20b and the side plates 60a to 60d, the tab 66a of the end plate 20a is positioned between the tabs 70a of the side plate 60a, and the tab 66b of the end plate 20b is positioned between the tabs 70b of the side plate 60c. The short coupling pins 64a are inserted to these tabs 66a, 66b, 70a, 70b for coupling the side plates 60a, 60c, and the end plates 20a, 20b.

Likewise, the tabs 72a of the side plate 60b and the tabs 66a, 66b of the upper end of the end plates 20a, 20b are positioned alternately, and the tabs 72b of the side plate 60d and the tabs 66a, 66b of the lower end of the end plates 20a, 20b are positioned alternately. The long coupling pins 64b are inserted into these tabs 66a, 66b, 72a, 72b for coupling the side plates 60b, 60d and the end plates 20a, 20b.

A plurality of screw holes 74 are formed along opposite edges of the side plates 60a to 60d. The screw holes 74 are arranged in the direction indicated by the arrow A. Further, screw holes 76 are provided along the lengths of the angle members 62a to 62d at positions corresponding to the screw holes 74. Screws 78 are inserted into the screw holes 76 and the screw holes 74 to fix the side plates 60a to 60d together using the angle members 62a to 62d. In this manner, the side plates 60a to 60d, and the end plates 20a, 20b are assembled into the casing 24 (see FIG. 4).

As shown in FIGS. 1 and 2, the spacer member 22 has a rectangular shape having predetermined dimensions such that the spacer member 22 is positioned inside the casing 24. The thickness of the spacer member 22 is selected such that the dimensional variation in the stacking direction of the stack body 14 is absorbed, and the desired tightening force is applied to the stack body 14. For example, the spacer member 22 is made of insulating material such as polycarbonate (PC) resin or phenol resin. However, the use of the spacer member 22 is not essential to carry out the present invention. The spacer member 22 may not be used in the case where the dimensional variation in the stacking direction is absorbed by the elasticity of the first and second metal separators 32, 34.

Next, operation of the fuel cell stack 10 will be described below.

Figure 4:
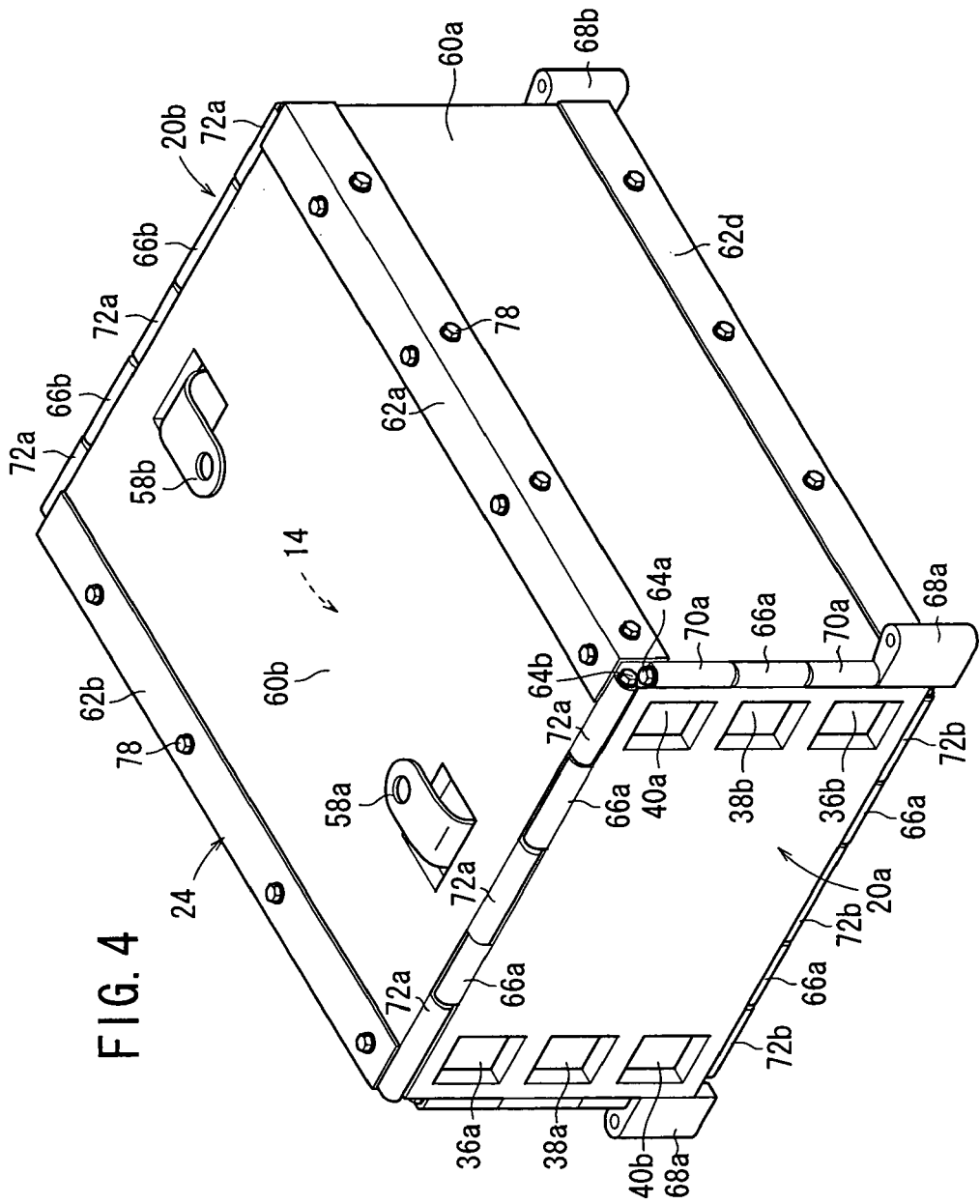
FIG. 4 is a perspective view showing the fuel cell stack.
Figure 5:
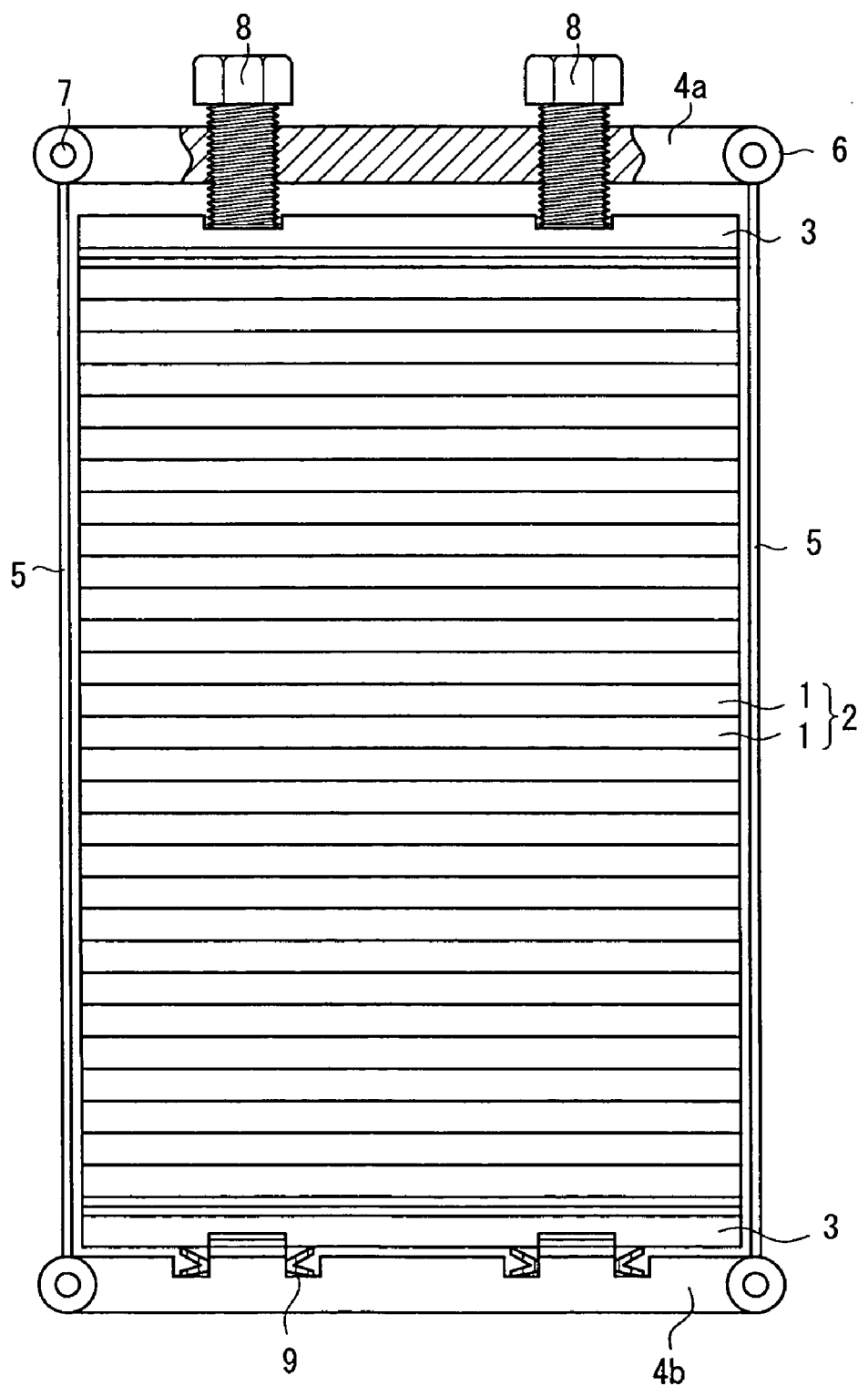
FIG. 5 is a view schematically showing a fuel cell stack disclosed in Japanese laid-open patent publication 2001-135344.

Firstly, as shown in FIGS. 1 and 4, an oxygen-containing gas is supplied to the oxygen-containing gas supply passage 36a from the end plate 20a of the fuel cell stack 10. A fuel gas such as a hydrogen-containing gas is supplied to the fuel gas supply passage 40a. Further, a coolant such as pure water, an ethylene glycol or an oil is supplied to the coolant supply passage 38a. Thus, the oxygen-containing gas, the fuel gas, and the coolant are supplied to each of the unit cells 12 stacked together in the direction indicated by the arrow A to form the stack body 14. The oxygen-containing gas, the fuel gas, and the coolant flow in the direction indicated by the arrow A.

As shown in FIG. 3, the oxygen-containing gas flows from the oxygen-containing gas supply passage 36a into the oxygen-containing gas flow field 52 of the second metal separator 34. The oxygen-containing gas flows along the cathode 46 of the membrane electrode assembly 30 for inducing an electrochemical reaction at the cathode 46. The fuel gas flows from the fuel gas supply passage 40a into the fuel gas flow field 48 of the first metal separator 32 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen in the oxygen-containing gas is consumed at the cathode 46, the oxygen-containing gas flows into the oxygen-containing gas discharge passage 36b, and is discharged to the outside from the end plate 20a. Likewise, after the fuel gas is consumed at the anode 44, the fuel gas flows into the fuel gas discharge passage 40b, and is discharged to the outside from the end plate 20a.

The coolant flows from the coolant flow field 50 into the coolant flow field 50 between the first and second metal separators 32, 34, and flows in the direction indicated by the arrow B. After the coolant is used for cooling the membrane electrode assembly 30, the coolant flows into the coolant discharge passage 38b, and is discharged to the outside from the end plate 20a.

In the embodiment of the present invention, the stack body 14 is housed in the box-shaped casing 24. The casing 24 includes the end plates 20a, 20b provided at the opposite ends in the stacking direction of the stack body 14, and the side plates 60a to 60d provided on the sides of the stack body 14. Further, the casing 24 includes the angle members 62a to 62d, and the coupling pins 64a, 64b. The angle members 62a to 62d couples the adjacent ends of the side plates 60a to 60d, respectively. The coupling pins 64a, 64b couples the end plates 20a, 20b and the side plates 60a to 60d.

Since the coupling pins 64a, 64b are used for coupling the end plates 20a, 20b and the side plates 60a to 60d, operations such as tightening adjustment of bolts are not required at the time of assembling the fuel cell stack 10. Thus, the fuel cell stack 10 can be assembled simply. Further, since the coupling pins 64a, 64b are used in the casing 24, the sides of the stack body 14 are kept in parallel, and are not likely to be displaced undesirably. The positional displacement due to vibrations or shocks can be prevented.

Each of the first and second metal separators 32, 34 of the unit cells 12 is the thin corrugated plate having a thickness ranging 0.1 mm to 0.3 mm, for example. Though the first and second separators 32, 34 do not have any shape retaining characteristics, since the stack body 14 is housed in the casing 24, the pressure is uniformly applied to surfaces of the unit cells 12. Thus, power generation performance and sealing characteristics are improved in each of the unit cells 12. Since the elasticity of the first and second metal separators 32, 34 is advantageously utilized, it is not required to provide any belleville spring in the casing 24. Thus, a compact and light fuel cell stack 10 as a whole can be produced easily. Since no belleville spring is used, the stack body 14 including the first and second metal separators 32, 34 are not deformed undesirably.

The stack body 14 is not deformed or twisted undesirably. Therefore, dimensional variation in the fuel cell stack 10 is reduced. In practical use, the fuel cell stack 10 is suitably mounted in a vehicle. Further, since the side plates 60a to 60d are securely coupled together by the angle members 62a to 62d, even if an external force is applied to the fuel cell stack 10, lateral positional displacement is not likely to occur in each of the unit cells 12. Even if shocks are applied to the unit cells 12, the power generation performance and the sealing characteristics can be maintained.

The spacer member 22 is interposed between the terminal plate 16b and the end plate 20b. Therefore, even if there is dimensional variation of the stack body 14 due to the difference of dimensions depending on the unit cells 12, the dimensional variation is absorbed simply by changing the thickness of the spacer member 22.

The sides of the rectangular end plates 20a, 20b are coupled to the side plates 60a to 60d by the coupling pins 64a, 64b, respectively. Thus, the stack body 14 is not tilted undesirably unlike the case where only two sides of the plates are coupled. The unit cells 12 are stacked in the horizontal direction. Therefore, the sides of the stack body 14 can be arranged easily in parallel unlike the case where the unit cells are stacked in the vertical direction. Accordingly, the undesirable deformation of the stack body 14 can be prevented.

In the embodiment of the present invention, the angle members 62a to 62d are used as the coupling members for example. However, it is not essential to use the angle members 62a to 62d. For example, the side plates 60a to 60d may have flanges which can be bent such that the flanges can be fixed by screws to couple the side plates 60a to 60d with each other. Alternatively, the side plates 60a to 60d may be combined together by welding to function as the coupling members.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
a box-shaped casing; and
a stack body provided in said box-shaped casing, said stack body being formed by stacking a plurality of unit cells in a stacking direction, said unit cells each including an electrolyte electrode assembly and metal separators sandwiching said electrolyte electrode assembly, said metal separators being corrugated plates, said electrolyte electrode assembly including a pair of electrodes each having a gas diffusion layer and a catalyst layer, and an electrolyte interposed between said electrodes, wherein said casing comprises:

end plates provided at opposite ends of said stack body in the stacking direction;

a plurality of side plates provided on sides of said stack body;

coupling members for coupling adjacent ends of said side plates; and a coupling pin for coupling said end plate and said side plate, wherein each of the corrugated plates includes a plurality of alternating ridges and grooves on one side and a plurality of alternating ridges and grooves on an opposed side, the grooves and ridges being linear and oriented perpendicular to the stacking direction of the fuel cell stack, wherein a ridge on one side of the plate corresponds to a groove on the opposed side of the plate, wherein a coolant flow field is formed between adjacent separators by direct contact of the ridges of one of the adjacent separators with the ridges of the other of the adjacent separators, wherein the corrugated plates include connecting portions extending from one end of a groove to a corresponding end of a ridge to directly connect the ridge to the groove, the connecting portions being both linear and slant such that the connecting portions are neither perpendicular nor parallel to the stacking direction of the fuel cell stack, so that the corrugated plates have elasticity in the stacking direction, wherein terminal plates are provided at opposite ends of said stack body in the stacking direction, and a spatially insulating spacer member for absorbing dimensional variation of the stack body in the stacking direction is interposed between at least one of said terminal plates and said end plate, the fuel cell stack including only a single spatially insulating spacer member at a single end of the fuel cell stack, and a tightening force applied to the fuel cell stack is adjusted by a thickness of the insulating spacer member, wherein the fuel cell stack is free of a spring member between the box-shaped casing and the terminal plates, and outer marginal regions of the metal separators comprise one or more sealing elements, and the sealing elements extend in the stacking direction only a portion of the distance between adjacent separators so that a gap exists between each sealing element and a seal of an adjacent separator.

2. A fuel cell stack according to claim 1, wherein said coupling member is an angle member.

3. A fuel cell stack according to claim 2, wherein said angle member is fixed to adjacent ends of said side plates by a screw.

4. A fuel cell stack according to claim 1, wherein a tab of said end plate and a tab of said side plate are positioned alternately, and said coupling pin is inserted into said tab of said end plate and said tab of said side plate.

5. A fuel cell stack according to claim 1, wherein said end plate has a rectangular shape, and each side of said rectangular end plate is connected to said side plate by said coupling pin.

6. A fuel cell stack according to claim 1, wherein said unit cells are stacked in a horizontal direction.

7. A fuel cell stack according to claim 1, wherein sealing members are formed between the metal separators and the casing to cover outer edges of the metal separators.

8. A fuel cell stack according to claim 7, wherein a seal is interposed between the sealing members to prevent an outer edge of the electrolyte from contacting the casing.

* * * * *